United States Patent

[11] 3,526,260

| [72] | Inventor | Guenter Weiberg |
| | | Wolfenbuttel, Germany |
| [21] | Appl. No. | 742,942 |
| [22] | Filed | July 5, 1968 |
| [45] | Patented | Sept. 1, 1970 |
| [73] | Assignee | Konservenfabrik Thiede G.m.b.H. |
| | | Salzgitter-Thiede, Germany |
| [32] | Priority | July 5, 1967 |
| [33] | | Germany |
| [31] | | No. K 62,730 |

[54] HIGH-PRESSURE STEAM PEELING MACHINES
16 Claims, 1 Drawing Fig.

| [52] | U.S. Cl. ................................................. | 146/47 |
| [51] | Int. Cl. .................................................. | A23n 7/00 |
| [50] | Field of Search ....................................... | 146/46, 47, |
| | 48, 282, 283, 284, 285, 221.7, 227 |

[56] References Cited
UNITED STATES PATENTS

| 499,598 | 6/1893 | Schell ........................... | 146/282X |
| 2,534,648 | 12/1950 | Wilbur ......................... | 146/227X |
| 2,631,628 | 3/1953 | Martin .......................... | 146/47 |

*Primary Examiner*—W. Graydon Abercrombie
*Attorney*—Craig, Antonelli, Stewart and Hill

ABSTRACT: An improved high-pressure steam peeling machine, comprising a pressure chamber or vessel with a steam inlet, a steam outlet and equipment for introducing and removing the materials to be peeled, wherein the improvement comprises a reversible screw arranged to revolve in an upright cylinder forming the pressure chamber, material inlet orifices in the cover and outlet orifices in the base of the cylinder and closing elements with conical metal seals, the tapering parts of which face outwardly from the pressure chamber.

Patented Sept. 1, 1970
3,526,260
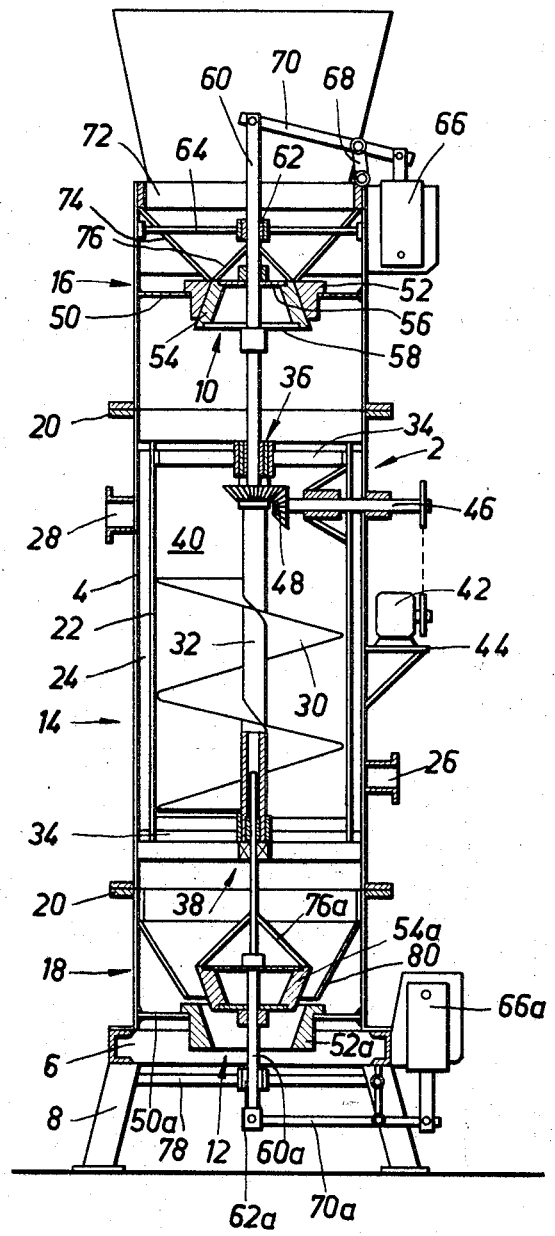
Inventor:
Günter Weiberg
BY Craig & Antonelli
ATTORNEYS

HIGH-PRESSURE STEAM PEELING MACHINES

DESCRIPTION

The basic principle of peeling by means of steam consists in subjecting the material to be peeled, such as, for example, root crops or potatoes, to saturated steam at a pressure of at least 85 p.s.i. for a certain period in a pressure vessel or chamber. During this period, the outer layer of the shell or peel is softened and is then caused to burst by suddenly reducing the pressure in the chamber. The detached shell is then removed in a second operation in a downstream high-pressure washing or scrubbing machine.

In a known high-pressure steam peeling machine of this kind, the pressure vessel is pear-shaped and is mounted rotatably in order to enable the material to be circulated within the vessel. A single opening is provided for introducing and removing the material, and this opening is closed by a conical closing element, the periphery of which is equipped with a sealing bead, resting from the inside against a sealing ring formed on the steam vessel and brought into the closing position by means of a compression spring.

Owing to the fact that this steam peeling machine must be rotatable in order to circulate the material, and in view of its configuration, this steam peeler is structurally expensive. The closing element represents a further disadvantage, because it is subject to accelerated wear, forms an insufficient seal and must be replaced fairly frequently.

It is an object of the invention to provide a high-pressure steam peeling machine of simple construction which operates economically and the closing elements of which have a longer useful life.

It is a further object of the invention to provide a high-pressure steam peeling machine of the kind above mentioned, in which the pressure vessel is constructed in the form of an upright metal cylinder, in which is mounted a screw serving to circulate and to transport the material, and rotatable about the centre axis of the cylinder and adapted to be driven in both senses of rotation, wherein a material inlet orifice is provided in the top cover of the said cylinder and a material outlet orifice in the base, both the said orifices being arranged to be closed and the closing elements comprise each a conical metal sealing member, the cones of which face outwardly from the pressure chamber.

It is a further object of the invention to provide a high-pressure steam peeling machine of the kind above mentioned, in which the steam may be quickly and uniformly distributed within the pressure chamber by providing the cylinder with a centrally mounted, perforated jacket, arranged in spaced relationship inwardly of the inner surface of the pressure vessel, and wherein the steam inlet terminates within the annular chamber thus formed.

In order to provide a favourable steam flow, the steam inlet may be located in the lower zone and the steam outlet in the upper zone of the said annular chamber. In this arrangement, the steam may enter uniformly from all sides through the annular chamber into the interior of the pressure vessel.

It is a further object of the invention to provide a high-pressure steam peeling machine, in which the outer diameter of the screw is such that its outer edge extends to near the inner surface of the inner jacket, thus preventing the material to drop over the edge of the screw.

The lead angle of the screw is preferably so chosen that the material of the charge does not roll down to the base of the cylinder but forms a pile cone which reaches to near the lowermost turn.

Conveniently, the screw extends only to a level just above the centre of the cylinder so that a free space is formed above the screw, into which the material to be peeled may be transported by circulating it by means of the reversing screw.

In order to provide a high contact pressure between the closing cone and its seating, the angle of aperture of the closing cones may be acute and may amount, in a preferred embodiment, to about 36°.

The contact surface between the cone and the seating should be as large as possible and may be so selected that one generatrix of the conical seats is longer than the small radius of the truncated cone and shorter than the long radius of the truncated cone.

Owing to the opening and closing movements of the closing member the cone grinds itself in relation to its seating and produces a good seal. In order to ensure that the more easily changed valve seat wears more quickly than the cone, the material of the cone is harder than the material of the seat and is more resistant to wear. The closing cones may be made of red casting, e.g., RG 5, and the seats of a bronze, e.g., of GBZ 10.

It is a further object of the invention to provide a high-pressure steam peeling machine of the kind hereinbefore described, in which the closing cones are actuated by means of axially displaceable, power-actuated, guide rods which are mounted and guided in bearings located in front of and behind the closing cones, and on which the closing cones are mounted. The ends of the guide rods located within the interior of the cylinder may be mounted in the shaft of the screw. The displacement of the guide rods may be effected by means of cylinders operated by a pressure medium.

The invention will be further described, by way of non-limiting example, with reference to the accompanying drawing, showing an axial cross-section of a high-pressure steam peeling machine according to the invention.

As shown in the drawing, the peeling machine comprises a pressure vessel 2, formed by an upright metal cylinder 4. This metal cylinder is mounted firmly on a frame 6 equipped with legs 8. The metal cylinder comprises three sections, namely a centre treatment chamber 14 and two end sections 16 and 18 adapted to receive the closing members for the inlet 10 for the material to be peeled and for the outlet 12 for the peeled material.

For reasons of easier manufacture, the individual housing parts may be formed as distinct tubular sections which are connected by means of flanged joints 20.

An inner jacket 22 is mounted in the centre part 14 of the pressure vessel 2 so that an annular chamber 24 is formed between the inner wall of the pressure cylinder and the outer wall of the inner jacket. A steam inlet 26 leads into the lower part of the annular chamber, and a steam outlet is located in its upper part on the side opposite to the steam inlet. The inner jacket has slotted perforations over its entire height so that, when the steam outlet is closed, steam entering through the inlet 26 is distributed quickly and uniformly and has access to the material to be peeled through the perforated inner jacket.

Inside the inner jacket 22 is a vertically mounted screw 30 serving to transport and circulate the material. The outer periphery of the screw extends to near the inner surface of the inner jacket, preventing the material to drop through the gap along the wall. The screw is mounted on a quill shaft 32, mounted in bearings provided at the level of the upper and lower ends of the inner jacket 22. The bearings are mounted on stays 34 fixed to the inner jacket. The upper bearing 36 is a radial bearing and the lower bearing 38 is a combined thrust and radial bearing.

The screw extends from the lower shaft bearing 38 to about three quarters of the height of the inner jacket 22 so that there remains a free space 40 above the screw. In order to support the distribution of the steam and to accelerate the evacuation of the steam, the screw may have slotted perforations.

The pitch angle of the screw is such that the material does not roll along the screw to the bottom of the cylinder, but forms a cone, reaching to near the bottommost turn, and the material does not roll down when the screw delivers in an upward direction or rolls more slowly than the upwardly directed transport movement.

The screw shaft 32 is driven by means of an electric motor 42. The electric motor 42 is mounted on a bracket 44 provided on the outside of the pressure vessel 2, and drives, via a chain or V-drive, a horizontal intermediate shaft 46 which passes through the housing wall and is sealed thereagainst, and which is connected with the screw shaft 32 by way of a bevel gearing 48. The bevel gear drive may be provided with a housing, not shown in the drawing in order to avoid contact with the material to be peeled.

The top closure of the pressure vessel is formed by a transverse wall 50, welded substantially in the centre of the upper tube section 16 and comprising the inlet opening 10 for the material to be peeled and adapted to be closed by closing elements. The closing mechanism comprises a seat 52 fitted into the opening 10 and having a conical seating surface, and a correspondingly formed closing member 54 in the shape of a truncated cone. The closing member 54 is conically recessed and closed by an upper and a lower cover plate, 56 and 58, respectively. The point of the cone is directed towards the top, i.e., outwardly from the pressure chamber so that the cone is firmly pressed into its seating when the vessel is pressurized.

A large seating surface has been chosen in order to ensure a well sealing, low-wear closure. For this reason, one generatrix of the conical seating face is larger than the small radius of the cone and smaller than its large radius. In order to grind the cone well into its seating during the opening and closing movements, the cone forms a very acute angle. In the embodiment shown in the drawing, the cone angle amounts to about 36°.

The material for the two elements of the closing device, namely the cone 54 and the seating 52, has been so chosen that the more easily replaced seating 52 wears more quickly than the cone 54. A harder, more wear-resistant material has been used for the cone than for the seating; thus, the seating 52 may be made preferably from a bronze, e.g., grade GBZ 10, and the cone may be a red casting, e.g., grade RG 5.

The closing cone 54 is mounted on an axially displaceable guide rod 60, arranged centrally relative to the metal cylinder 4, and located on both sides of the closing cone. The bearing located inside the pressure vessel is mounted within the hollow shaft 32 of the screw, whilst the outer bearing 62 is held by stays 64 mounted on the cylinder wall.

The movement of the closing cone 54 is actuated by means of a compressed air cylinder 66, mounted on the outside of the upper section of the metal cylinder 4. The stroke is transmitted by a lever 70 mounted on a pivotable support 68.

The upper opening 72 of the cylinder serves to receive the material to be peeled which is introduced through a hopper 74 into the filler orifice 10. In order to prevent the material from being deposited in part on the top cover plate 56 of the truncated cone, the same is provided with a deflector cone 76 directed in the direction opposite to the movement of the material during the filling.

The closing elements for the discharge orifice 12 formed in the base 50a of the metal cylinder 4, and the associated actuating elements are formed in the same way as the elements associated with the filler orifice 10. The bottom closure comprises a seat 52a and a closing cone 54a the point of which is directed outwards and which is mounted on a guide rod 60a. As above, one end of the guide rod 60a is mounted in the quill shaft 32 and the other side in an external bearing 62a, mounted on stays 78 extending between the supporting legs 8. The system is actuated by means of a lever 70a connecting the guide rod 60a with a pneumatic cylinder 66a, mounted on the outside of the frame 6.

A hopper 80, provided in the lower section 18 of the metal cylinder transports the peeled material to the outlet orifice 12. A deflector cone 76a is provided on the rear side of the closing cone 54a and prevents peeled material from being deposited on the rear side of the closing cone 54a.

The whole installation can be controlled automatically by means of a control mechanism, not shown in the drawing, which controls the timing of the opening and closing cycles of the filler and discharge orifices for the material and the steam inlet and outlet, as well as the movement of the screw. The steam inlet and outlet are here equipped with compressed air operated stopcocks, not shown in the drawing, by means of which very short opening and closing times may be achieved.

Further equipment also comprises a safety valve and a pressure gauge with test flange.

All operations of one softening cycle are controlled by timing relays, which can be adjusted at any time. Electrical contactors transmit the impulses from the relays to the motors and pneumatic cylinders.

The high-pressure steam peeler according to the invention may be constructed for any performance up to about 4 tons per hour.

The performance is determined by the duration, during which the steam must act on the material to be peeled, and by the size of the pressure chamber. From an hourly throughput of about 3 tons, it is recommended to use two steam cylinders in parallel which are charged alternatively.

In this construction, the steam is supplied and evacuated through a three-way valve. The exhaust steam is then used for charging the other cylinder, until equilibrium has been established between the cylinders. Then the three-way valve is reversed and the remainder of the steam is condensed in a condenser, whilst the steam charge for the other vessel is completed from a steam source until the required pressure has been reached. With this construction and operation it is possible to save up to 50 percent in steam expenditure.

The high-pressure steam peeling machine just described operates as follows:

A feeder elevator which is also connected to the automatic control, transports the material to be peeled to the charging hopper in accordance with the working cycle of the machine, and the material is discharged from the hopper through the open inlet orifice into the pressure vessel. The charge of the pressure vessel is such that the top part of the vessel, i.e., the space into which the screw does not project, remains free. During the charging, the lower closing cone and the steam inlet and outlet are closed. Since it is desirable that the material to be peeled should be deposited loosely in the steam chamber, the screw is not operated during the charging so that, owing to the pitch of the screw, the material drops down substantially to the bottommost turn. When the steam chamber has been filled with the required amount of material, the elevator is stopped and the upper closing cone is closed. The steam inlet valve opens and saturated steam at a pressure of about 128 p.s.i. is supplied into the interior. A certain delay is provided between the opening of the steam valve and the closing of the upper closing cone, allowing the air in the vessel to escape. At the same time, the screw starts to turn in reverse motion and transports the material into the free upper space 40. There it is recirculated by the movement of the screw until the steaming cycle is completed. Then the screw is stopped, the steam inlet valve is closed and the steam outlet valve opened. The exhaust steam flows into a condenser tank.

Then both the upper and the lower closing cones are opened and the screw is operated in the forward direction, in which the steamed material is transported downwardly, passing from the discharge hopper 80 to the lower orifice 12 from where it flows into a trough mounted underneath the pressure cylinder. After the pressure vessel has been completely discharged, the outlet orifice is closed and a new working cycle starts.

During this next cycle, the steamed material is carried by a conveyor belt at constant speed to a high-pressure washing machine in which the softened shell or peel is removed by high-pressure spraying.

Where two steam cylinders are connected in parallel, these cylinders operate alternatively, that is to say, during the steaming period of the first cylinder, the second cylinder is discharged and charged. The three-way valves for the steam inlet and outlet incorporated in this circuit are also connected to the automatic control.

I claim:
1. An improved high-pressure steam peeling machine for root crops and potatoes, comprising a pressure chamber equipped with a steam inlet and a steam outlet and closable openings for charging and discharging the material to be peeled, wherein the improvement comprises that the pressure vessel is an upright cylinder with a reversible screw mounted therein rotatably about a hollow shaft disposed in the axis of the cylinder and serving to circulate and to transport the material and in that the opening for charging the material into the cylinder is located in the top cover plate and the opening for discharging the material in the base of the cylinder and each opening is associated with a closing member in the form of a truncated cone, the narrower part of which faces away from the interior of the pressure vessel, and wherein the cones rest on seating surfaces having the same inclination and substantially the same size as the cones.

2. A high-pressure steam peeling machine as set forth in claim 1, wherein the metal cylinder is equipped with an interior perforated jacket, mounted in spaced relationship from the inner wall of the cylinder and forming an annular chamber therewith.

3. A high-pressure steam peeling machine as set forth in claim 1 and equipped with an interior jacket in spaced relationship from the cylinder, wherein the steam inlet port is arranged in the lower zone of the said annular chamber.

4. A high-pressure steam peeling machine as set forth in claim 1 and equipped with an interior jacket in spaced relationship from the cylinder, wherein the steam outlet port is arranged in the upper zone of the said annular chamber.

5. A high-pressure steam peeling machine as set forth in claim 1 and equipped with an interior jacket in spaced relationship from the cylinder, wherein the outer rim of the screw extends to near the inner wall of the jacket.

6. A high-pressure steam peeling machine as set forth in claim 1, wherein the angle of pitch of the screw is such that the material charge does not roll down to the base of the cylinder when the screw is not in motion, but forms a material cone reaching to near the lowest turn.

7. A high-pressure steam peeling machine as set forth in claim 1, wherein the screw extends only to a height somewhat above the mid-height of the cylinder, leaving a free space above the screw.

8 A high-pressure steam peeling machine as set forth in claim 1, wherein the truncated cones form an acute angle.

9. A high-pressure steam peeling machine as set forth in claim 1, wherein the acute angle formed by the truncated cones is an angle of substantially 36°.

10. A high-pressure steam peeling machine as set forth in claim 1, wherein the material of the truncated closing cones is harder and more resistant to wear than the material of the seating surfaces of the closing mechanisms.

11. A high-pressure steam peeling machine as set forth in claim 1, wherein the cones are made of a harder material than the associated seating surfaces, wherein the truncated closing cones are made from red brass and the seating surfaces of bronze.

12. A high-pressure steam peeling machine as set forth in claim 1, wherein one generatrix of the cone seating face is longer than the small radius of the truncated cone and shorter than its long radius.

13. A high-pressure steam peeling machine as set forth in claim 1 wherein the truncated closing cones are mounted on axially displaceable, power-operated guide rods.

14. A high-pressure steam peeling machine as set forth in claim 1, with the closing cones mounted on actuating rods, wherein the actuating rods are guided in bearings on both sides of the truncated closing cones.

15. A high-pressure steam peeling machine as set forth in claim 1, with the actuating rods of the closing cones guided on both sides of the cones in bearings, wherein the ends of the guide and actuating rods located within the interior of the cylinder are mounted in the hollow shaft of the screw.

16. A high-pressure steam peeling machine as set forth in claim 1, wherein the truncated closing cones are adapted to be moved by means of pressure medium operated working cylinders.